United States Patent
Utsumi et al.

(10) Patent No.: US 8,059,235 B2
(45) Date of Patent: Nov. 15, 2011

(54) LIQUID CRYSTAL DISPLAY

(75) Inventors: Yuka Utsumi, Hitachi (JP); Makiko Sugibayashi, Hitachi (JP); Ikuo Hiyama, Hitachinaka (JP); Katsumi Kondo, Mito (JP); Mutsumi Maehara, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 320 days.

(21) Appl. No.: 12/363,851

(22) Filed: Feb. 2, 2009

(65) Prior Publication Data
US 2009/0141220 A1    Jun. 4, 2009

Related U.S. Application Data

(63) Continuation of application No. 11/020,083, filed on Dec. 23, 2004, now Pat. No. 7,489,374.

(30) Foreign Application Priority Data
Dec. 26, 2003    (JP) .................................. 2003-431802

(51) Int. Cl.
   *G02F 1/1335*    (2006.01)
(52) U.S. Cl. ..................................... 349/106
(58) Field of Classification Search .......... None
   See application file for complete search history.

(56) References Cited

U.S. PATENT DOCUMENTS

| | | | |
|---|---|---|---|
| 6,646,699 B2 * | 11/2003 | Utsumi et al. | 349/104 |
| 7,016,005 B2 * | 3/2006 | Koike | 349/144 |
| 7,139,061 B2 * | 11/2006 | Ikeda et al. | 349/156 |
| 2002/0075429 A1 * | 6/2002 | Fujioka et al. | 349/106 |
| 2005/0030448 A1 | 2/2005 | Huh | |
| 2005/0083452 A1 * | 4/2005 | Rho | 349/106 |
| 2008/0180612 A1 * | 7/2008 | Jang | 349/106 |

FOREIGN PATENT DOCUMENTS

| | | |
|---|---|---|
| JP | 2002-040233 | 2/2002 |
| JP | 2003-084271 | 3/2003 |

* cited by examiner

*Primary Examiner* — Thanh-Nhan Nguyen
(74) *Attorney, Agent, or Firm* — Antonelli, Terry, Stout & Kraus, LLP.

(57) ABSTRACT

A liquid crystal display includes a pair of substrates having a polarizer, a liquid crystal layer sandwiched between the substrates of the pair, a color filter layer sandwiched between one of the substrates of the pair and the liquid crystal layer, a light source for supplying light to the pair of substrates, the liquid crystal layer, and the color filter layer. The color filter layer includes three filters for displaying blue, green and red. Only the green filter of the three filters selectively includes an absorbing component capable of absorbing a light spectrum within a wavelength range from 480 nm to 500 nm.

4 Claims, 11 Drawing Sheets

LIQUID CRYSTAL DISPLAY

CROSS REFERENCE TO RELATED APPLICATION

This application is a continuation application of U.S. application Ser. No. 11/020,083, filed Dec. 23, 2004 now U.S. Pat. No. 7,489,374, the contents of which are incorporated herein by reference.

BACKGROUND OF THE INVENTION

The present invention relates to a liquid crystal display (LCD) and an LCD panel which each include a component to absorb light having a particular wavelength.

A liquid crystal display is advantageous in that the display can be thinner and lighter than a Cathode Ray Tube (CRT generally called a Braun Tube in many cases). Therefore, usage thereof becomes wider with development and advance of a viewing angle widening technology and a mobile picture technology.

With widening uses of a monitor for a desktop personal computer or for a printing and designing jobs and for a liquid crystal television set, demands for color purity of blue, green, and red as well as for color reproduction of gray scale such as a color of skin of a human have become stronger. This leads to application of color filters to increase color purity of three primary colors as a basis of the color reproduction. As for a technique to use color filters, for example, JP-A-2002-40233 describes a technique to use a selective wavelength absorbing filter to suppress unnecessary emission of light from a backlight.

On the other hand, since a liquid crystal television set requires high luminance, the backlight having high luminance is generally employed. However, when the luminance of the backlight becomes higher in a liquid crystal display, there arises a problem in real black color representation. That is, since the LCD panel serves as an optical shutter to adjust light of the backlight, it is almost impossible for the following reason to completely interrupt light at black representation. The display panel has transmittivity of a finite value. A product between the transmittivity and the luminance of the backlight leads to luminance of a finite value at black representation. Therefore, when a backlight having high luminance is used, it is also possible to increase luminance at black representation. This arises a problem that black cannot be clearly displayed on screen images of content of a movie or the like which have relatively low luminance, for example, screen images of scenes at night.

For example, JP-A-2003-84271 describes a technique for use with a liquid crystal display requiring high luminance to display white and low luminance and a high contrast ratio to display black. According to the technique, luminance is suppressed at black representation without reducing luminance at white representation.

SUMMARY OF THE INVENTION

As above, it is important for the liquid crystal display to conduct real black color representation. Particularly, to view screen images of a large-screen television set in a dark room such as a home theater, a black brightening phenomenon is quite uncomfortable for the viewers. This is caused by a perception of a human. That is, in a dark environment, a human becomes quite sensitive to luminance.

The inventors have recognized an event through research on black representation and transmittivity of black of an LCD panel in an actual liquid crystal display. That is, polarized light having passed through a polarizing plate or polarizer on a light source side is partly depolarized when the light passes through various components of the LCD panel. It has also been detected that the component of light depolarized as above is not absorbed by a polarizing axis of a polarizer on a light emitting side and hence is emitted as transmitted light. That is, since the transmittivity of black increases, luminance increases at representation of black. Therefore, the contrast ratio reduces and black cannot be clearly displayed. It is considered that the depolarization of the polarized light is caused due to factors as follows. The factors are, for example, scattering by pigment particles in a color filter layer using pigment, disorder in order parameters of liquid crystal, reflection on a boundary face between components having mutually different refractive indices such as a transparent electrode and an insulator, reflection by a metallic electrode, and interference by optical thin layers such as a transparent electrode, an insulator, and an alignment layer. A crossed polarizer has a configuration indicating a relationship between perpendicular incidence and perpendicular emission of light. When this is viewed from an inclined direction, it can be said that the crossed or vertical relationship, i.e. the relationship of 90° is broken. This means that the polarizer cannot interrupt light coming from an inclined direction, particularly, a 45° direction. This affects in the liquid crystal display not only the viewing angle characteristic but also the luminance of black. This is because the light from the light source used in the liquid crystal display is not collimate light. Although directivity is in general slightly provided for a prism sheet or the like, a light incident thereto from an inclined direction is scattered and is refracted due to influence of the components described above, and polarized light depolarized as a result is emitted in a front direction.

As a result of discussion in detail on the polarization degree of a polarizer, it has been detected that the degree of polarization of the polarizer is not evenly kept within a range of visible wavelengths from 380 nanometers (nm) to 780 nm, practically, from 400 nm to 700 nm. It has been recognized that this also affects increase in the transmittivity of black when the polarized light is partly depolarized by the above components of the LCD panel.

Resultantly, the black representation has luminance remarkably higher than luminance at representation of ideal and principle black determined by the degree of polarization of the polarizer.

The techniques described in JP-A-2002-40233 and JP-A-2003-84271 are advantageous respectively in the improvement of color purity and in the improvement of the contrast ratio by absorption of polarized light passing through the crossed polarizer. However, the techniques do not control leakage of light due to depolarization, which is an object characteristic to the present invention.

FIG. 1 is a graph to explain a principle of the present invention. Referring to FIG. 1, description will be given of a way to achieve the object according to the present invention. In FIG. 1, a solid line 101 is a spectral example of intensity of emitted light at black representation on a liquid crystal display and a solid line 102 is a spectral example of emitted light intensity at white representation thereon. In this example, since a three band fluorescent lamp using a cold-cathode tube is used as a light source, the emission intensity is relatively shown by assuming that intensity of light having a primary emission wavelength of 545 nm from green phosphor of the three band fluorescent lamp is one. It can be seen from FIG. 1 that the emitted light intensity of 490 nm light remarkably varies between black representation and white representation.

Characteristic emission in the vicinity of 490 nm at black representation is a main factor of increase in luminance at black representation. According to the principle of the present invention, pigment or dye having an absorption characteristic indicated by a solid line 103 in FIG. 1 is disposed in a light source, at a position between a light source and a polarizer on an emission side of an LCD panel, or on an upper surface of the polarizer.

The present invention is further effective when a liquid crystal display is used as a liquid crystal television set requiring higher luminance than a monitor of a personal computer. In a liquid crystal display of normally closed type displaying black with lower luminance, the leakage of light exerts stronger influences. Therefore, the present invention is more effectively applicable to the normally-closed liquid crystal display.

The present invention is efficiently applicable, regardless of a liquid crystal display method, e.g., an in-plane switching (IPS) method or a vertically aligned (VA) method, when the leakage of light due to depolarization causes a problem to be solved.

Next, description will be given of a specific configuration according to the present invention.

The inventors proposes, as an example of the embodiment of the present invention, a liquid crystal display including a pair of substrates including a polarizer, a liquid crystal layer sandwiched between the pair of substrates, an absorbing component including pigment having dichroism in which absorption and transmission vary on a plane of polarization in a wavelength range from 400 nm to 500 nm, and a unit for supplying light to the liquid crystal layer.

In the configuration, "a unit for supplying light to the liquid crystal layer" includes, for example, a light source of a backlight.

According to the present invention, there is provided a liquid crystal display including a pair of substrates including a polarizer and a color filter layer, a liquid crystal layer sandwiched between the pair of substrates, and a unit for supplying light to the liquid crystal layer. The color filter layer includes three filters for displaying blue, green, and red. Only the green filter of the three filters selectively includes an absorbing component.

According to the present invention, there is provided a liquid crystal display including a pair of substrates including a polarizer and a color filter layer, a liquid crystal layer sandwiched between the pair of substrates, and a unit for supplying light to the liquid crystal layer. The color filter layer includes three filters for displaying blue, green, and red. A spectrum absorbing layer is selectively arranged in an upper section or a lower section of the green filter of the three filters.

According to the present invention, there is provided a liquid crystal display in which a liquid crystal layer is sealed between a pair of substrates including at least one transparent substrate and being separated from each other by a predetermined gap and polarizers are arranged on outer sides of the respective substrates. A spectrum absorbing component to selectively absorb a wavelength of characteristic leakage light at black representation is disposed at a position between a light source unit and an upper surface of a liquid crystal display panel.

The inventors proposes a liquid crystal display including a normally-closed liquid crystal display panel in which a liquid crystal layer is sealed between a pair of substrates including at least one transparent substrate and being separated from each other by a predetermined gap and polarizers are arranged on outer sides of the respective substrates, a light source unit, and a light guide arranged below the liquid crystal display panel for uniformly supplying light emitted from the light source unit to the liquid crystal display panel. The normally-closed liquid crystal display panel is a liquid crystal display panel of in-plane-switching type in which plural electrodes and active elements are formed on primarily one of the substrates and an electric field applied from the active elements to the liquid crystal layer is in a direction substantially parallel to the substrates. A spectrum absorbing component to selectively absorb a wavelength of characteristic leakage light at black representation is disposed at a position between the light source unit and an upper surface of the liquid crystal display panel.

The inventors proposes a liquid crystal display including a normally-closed liquid crystal display panel in which a liquid crystal layer is sealed between a pair of substrates including at least one transparent substrate and being separated from each other by a predetermined gap and polarizers are arranged on outer sides of the respective substrates, a light source unit, and a light guide arranged below the liquid crystal display panel for uniformly supplying light emitted from the light source unit. The normally-closed liquid crystal display panel is a liquid crystal display panel in a vertical alignment mode in which alignment of a long axis of liquid crystal molecule molecules is substantially vertical to the substrates when any voltage is not applied thereto and becomes inclined toward the substrates as an electric field is applied thereto. A spectrum absorbing component to selectively absorb a wavelength of characteristic leakage light at black representation is disposed at a position between the light source unit and an upper surface of the liquid crystal display panel.

For the light source used as a unit for supplying light and the light source of the light source unit, a cold-cathode tube using emission of phosphor, a cold-cathode fluorescent using light emission of narrow-peak-band emitted phosphor, a light emitting diode, organic electroluminescence, and the like can be used. Using these elements, a plurality of light sources may be disposed on a side surface and/or a rear surface of the light guide. Or, these elements may be used as luminous bodies on a surface.

The spectrum absorbing component is a spectrum absorber arranged between the light source of the light source unit and the light guide.

When a diffuser is disposed on a rear surface of the light guide, the spectrum absorbing component is a spectrum absorbing layer arranged between the light guide and the diffuser.

The spectrum absorbing component may be implemented by coating a light path surface of the light guide with a macromolecular layer.

When the spectrum absorbing component is formed in the light source unit, the component may be implemented by coating the light source with a macromolecular layer.

The spectrum absorbing component may include, as a support layer of a polarizer, a resin layer to which a spectrum absorbing agent is added. That is, a spectrum absorbing pigment or the like is added to a triacetyl cellulose resin layer generally used as a support layer of a polarizer or a resin layer capable of replacing the triacetyl cellulose resin layer.

The above object can be achieved by adding a pigment having an absorption peak substantially in a wavelength range from 480 nm to 500 nm to a constituent component of the color filter of the liquid crystal panel to pass green light. The pigment may be added to the overall color filter layer or to an overcoat layer thereof. The pertinent layer may be at the same level of the layer of pigments to develop colors of the color filter layer or at a level different from that of pigments to dispose one layer as an absorbing layer.

The pigments are, for example, NK2071 and NK3981 (Hayashibara Biochemical Laboratories). For reagents, it is desirable that an absorption band exists in a wavelength range in which intensity characteristically increases at black representation and absorption does not occur in a wavelength range required for representation of colors from gray scale to white. A specific example will be described using a spectral characteristic of a green color filter. The spectral of light transmitted through a green color filter is set to a wavelength range from 520 nm to 550 nm to achieve high color purity of green. Light sources conducting light emission in this range are selected. The desirable emission wavelength range also applies to fluorescent lamps and light emitting diodes. At black representation, light of which polarization is depolarized by Rayleigh scattering is more dominant than the transmission characteristic of the color filter. Therefore, leakage light from the green filter is light in a range of wavelengths less than 520 nm. The wavelength of the leakage light due to depolarization of light caused by Rayleigh scattering varies depending on, for example, kinds, size, and shapes of an organic pigment used in the color filter. There exist a case in which a peak appears in the vicinity of 490 nm and a case in which strong leakage light appears in the vicinity of 450 nm. Therefore, it is desirable to use a pigment which absorbs leakage light shifted to a shorter wavelength as a result of depolarization caused by Rayleigh scattering and which does not absorb light to display inherent green. When a color filter which causes a wavelength shift to, for example, 490 nm is used, there is formed a spectrum absorber using a pigment or dye having a maximum of absorption in the vicinity of 490 nm. In this case, it is required as much as possible that the absorption wavelength of the pigment is selected not to overlap with a wavelength range from 540 nm to 550 nm used to display green. Actually, an end section of the absorption wavelengths extends up to a wavelength in the vicinity of 550 nm in some cases. In such a case, the pigment density is determined such that the absorbance of the pigment in the vicinity of wavelength range from 540 nm to 550 nm is about 25% or less of the absorbance at 490 nm. When the absorbance in the vicinity of 490 nm is more than that in the range from 540 nm to 550 nm, there is obtained an advantage to interrupt the leakage light. However, the more the absorbance at 490 nm is, the more the leakage light is interrupted, and hence the advantage to obtain a high contrast ratio becomes more conspicuous. By using a pigment or dye of which the absorption spectral end section does not overlap with a wavelength in the vicinity of a wavelength range from 540 nm to 550 nm, the advantage to interrupt leakage light is enhanced as the absorbance at 490 nm increases. Therefore, it is possible, by setting the pigment density to a high value, to efficiently absorb leakage light in the vicinity of 490 nm, and the advantage of the high contrast ratio becomes conspicuous.

Assuming that a color filter causing leakage light in the vicinity of 450 nm wavelength is used. On the situation, since the wavelength is substantially overlapped with that of blue, it is required to form a pigment layer contiguously with a green filter or to employ a configuration in which pigment coexists in the filter. For the pigment of which the maximum point of absorption occurs in the vicinity of 450 nm, the end section of absorption rarely extends up to a wavelength range from 540 nm to 550 nm in many cases. Therefore, it is also possible to set the pigment density to a large value with which the absorbance at 450 nm is 0.6 or more. However, when the end section of absorption overlaps with the wavelength range from 540 nm to 550 nm, the pigment density is determined as described above such that the absorbance of the pigment in the vicinity of the wavelength range from 540 nm to 550 nm is about 25% or less of the absorbance at 490 nm.

Referring to FIG. 2, description will be given of a principle of another configuration according to the present invention. In FIG. 2, a solid line 104 indicates a spectral example of emission intensity at black representation on the liquid crystal display and a solid line 105 indicates a spectral example of emission intensity at white representation thereon. Since this example uses as a light source a three band fluorescent lamp including a cold-cathode tube, the data is relatively indicated by assuming that intensity of emitted light with a primary wavelength of 545 nm of green phosphor used in the three band fluorescent lamp is one. It can be seen that between when black is displayed and when white is displayed, the emission intensity remarkably varies in a wavelength range from 435 nm to 490 nm. To cope with this condition, there is desirably used a configuration in which a pigment or dye having dichroism is disposed on an upper surface of a liquid crystal display panel, the pigment having dichroism indicated by solid lines 106 and 107 in FIG. 2 in association with a characteristic wavelength at black representation. For example, a single-axial polyvinyl alcohol macromolecular layer including a pigment or dye having dichroism is arranged such that an absorption axis of the dichroic pigment is vertical to an absorption axis of an polarizer on an emission side. The absorption characteristic at black representation is indicated by the solid line 106 of FIG. 2 indicating that light with a wavelength of which the emission intensity characteristically increases at black representation is satisfactorily absorbed. At white representation, the absorption becomes remarkably weak as in the operation of the polarizers of the liquid crystal display panel. This is indicated by, for example, the solid line 107 in FIG. 2. Resultantly, leakage light to increase luminance of black is efficiently absorbed at black representation. At representation ranging from grey scale to white, absorption of light is reduced and light emitted from the liquid crystal display panel is almost kept retained and hence reduction of luminance can be suppressed.

As another configuration of the present invention, there is proposed a normally-closed liquid crystal display in which a liquid crystal layer is sealed between a pair of substrates including at least one transparent substrate and being separated from each other by a predetermined gap and polarizers are arranged on outer sides of the respective substrates. A spectrum absorbing component to selectively absorb a wavelength of characteristic leakage light at black representation is disposed at an upper surface of a liquid crystal display panel. The spectrum absorbing component has dichroism.

According to the present invention, there is proposed a liquid crystal display wherein the normally-closed liquid crystal display panel is a liquid crystal panel of in-plane-switching type in which plural electrodes and active elements are formed on primarily one of the substrates and an electric field applied from the active elements to the liquid crystal layer is in a direction substantially parallel to the substrates.

According to the present invention, there is proposed a liquid crystal display including a normally-closed liquid crystal display panel in which a liquid crystal layer is sealed between a pair of substrates including at least one transparent substrate and being separated from each other by a predetermined gap and polarizers are arranged on outer sides of the respective substrates, a light source unit, and a light guide arranged below the liquid crystal display panel for uniformly supplying light emitted from the light source unit. The normally-closed liquid crystal display panel is a liquid crystal display panel in which alignment of liquid crystal is substantially vertical to the substrates when any voltage is not applied thereto, becomes substantially horizontal when a predetermined voltage is applied thereto, and becomes inclined when a voltage less than the predetermined voltage is applied thereto.

As a unit for supplying light and the light source of the light source unit, a cold-cathode tube using emission of phosphor, a cold-cathode tube using light emission of narrow-peak-band emitted phosphor, a light emitting diode, organic electroluminescence, and the like can be used. Using these elements, a plurality of light sources may be disposed on a side surface and/or a rear surface of the light guide. Or, these elements may be used as luminous bodies on a surface.

Assuming that the spectrum absorbing component is a pigment having dichroism indicating absorption only in a fixed direction and that the pigment is included in a macromolecule supporter to align molecules of the pigment in a fixed direction. Under these circumstances, the macromolecular layer is arranged such that a direction in which the dichroic pigment indicates absorption is perpendicular to a polarizing axis of an upper surface of the liquid crystal panel, that is, an absorption axis of the polarizer arranged on the side of an observer of the liquid crystal display. The macromolecular layer may be arranged on an outer side of the polarizer on the emission side or may be a supporter of the polarizer in an upper-most layer.

When the pigment is a dichroic dye having a dichroic ratio and having both an absorption axis and a transmitting axis, there may be used dichroic pigments of yellow type such as LSY310, LSY322, LSY116, LSY120, LSY423, and LSY108 of Mitsubishi Chemical Corporation.

Polarized light incident to the liquid crystal display panel is partially deporalized when the light passes through the panel and unnecessary leakage light is emitted. This consequently increases luminance of black to reduce the contrast ratio. By disposing a component to selectively absorb the characteristic leakage light at black representation, there is provided a liquid crystal display in which performance of black representation is improved and a high contrast ratio is obtained.

DESCRIPTION OF THE EMBODIMENTS

Referring now to FIGS. 1 to 14, description will be given of an embodiment of a liquid crystal display according to the present invention.

First Embodiment

Figure 3:
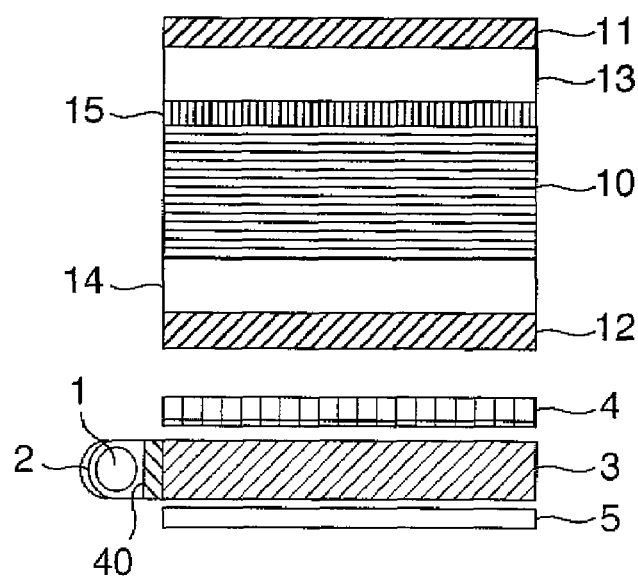
FIG. 3 is a cross-sectional view schematically showing an example of a liquid crystal display according to the present invention.

FIG. 3 schematically shows a cross-sectional view of a liquid crystal display according to the present invention.

A light source unit disposed in a rear surface of an LCD panel of the first embodiment includes a light source 1, a light cover 2, a light guide 3, a diffuser 4, and a reflector 5. Although not shown, an adhesion layer is formed to prevent loss of light by a layer of air between the light guide 3 and the diffuser 4. A prism sheet may be disposed between the diffuser 4 and a polarizer 12, which will be described later. There may be employed a configuration including a phase plate, not shown, between the polarizers 11 and 12 and substrates 13 and 14 adjacent thereto. The phase plate is employed to improve picture quality of a liquid crystal display depending on cases. Specifications of the phase plate are determined according to purposes of use thereof. The effect and the object of the present invention are independent of presence or absence of arrangement of the phase plate. Therefore, the present invention is not restricted by presence or absence of the phase plate.

In the first embodiment, a spectrum absorber 40 is disposed between the light source 1 and the light guide 3 of the light source unit. The spectrum absorber 40 is a polyvinyl alcohol macromolecular layer including a pigment having an absorption peak at 490 nm as indicated by a solid line 103 in FIG. 1. The spectrum absorber 40 is formed, for example, by mixing pigment NK2071, one weight percentage aqueous solution of polyvinyl alcohol having a mean molecular weight of 1500, and methanol with each other at 0.025:1:1. A 0.5 millimeter (mm) thick glass plate is washed through an ultraviolet (UV) ozone process to possess a hydrophilic surface. The glass plate is then coated with the mixed solution by a spinner (for about three seconds at 350 revolution per minute (rpm) and for about 25 seconds at 1500 rpm). The substrate is dried at 150° for three minutes on a hot plate to produce a spectrum absorber 40 coated with an about 0.3 micrometer (μm) thick polyvinyl alcohol (PVA) layer including a pigment. This method is only an example of production of a spectrum absorber. Materials and processes for the spectrum absorber are not restricted by the method of this embodiment. For example, a macromolecular layer may be formed in the form of a film not using a glass substrate as a supporter.

The first embodiment adopts an in-plane-switching LCD panel in which an electric filed applied to a liquid crystal layer is substantially parallel to substrates is adopted as an LCD panel of normally closed type using birefringence. However, the present invention is not restricted by the embodiment in the pixel layout, the electrode layout, and the like.

In the LCD panel, a layer of liquid crystal including a plurality of compounds is sandwiched between two transparent substrates 13 and 14. On the outsides of the paired substrates, the polarizers 11 and 12 are respectively arranged. Electrodes, insulating layers, and alignment layers are not shown in FIG. 3. These components are actually formed on a substrate.

Figure 4:
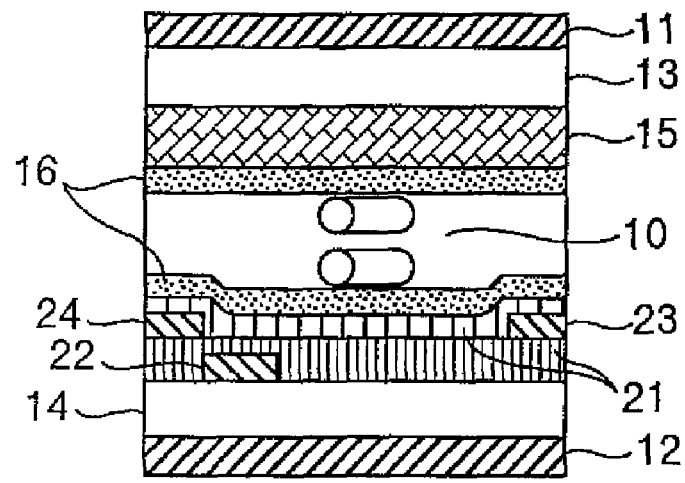
FIG. 4 is a cross-sectional view schematically showing an example of an LCD panel according to the present invention.

Referring now to FIG. 4, description will be given of an in-plane-switching LCD panel. On a surface of the substrate 14 on the internal side of the panel, electrodes 22 and 23 striped in FIG. 4 are formed and an alignment layer 16 is formed thereon. The electrode 22 is a common electrode to which a voltage of a predetermined waveform independent of an image signal is applied. The electrode 23 is a pixel electrode to which a voltage of a waveform changing according to an image signal is applied. A video signal electrode 24 is arranged at a position of the same height as for the pixel electrode. An insulating layer 21 is made of silicon nitride. The electrodes and the insulating or isolating layer are formed in a method ordinarily used. Although thin-film transistor (TFT) elements and the like formed using, for example, amorphous silicon and polycrystalline silicon are not shown in FIG. 4, the in-plane-switching LCD panel used in the first embodiment is an LCD panel of active matrix addressing type.

On the opposing substrate 13, a color filter layer 15 is formed to display color images. In the first embodiment, the color filter is formed on the substrate 13 opposing the substrate 14 on which the electrodes 22, 23, and 24 are formed. In another configuration, the color filter layer 15 may be formed on the substrate 14 on the same side as for the electrodes 22, 23, and 24.

To form the alignment layer 16, polyamide solution of a concentration of 3% is coated and is then cured at 200° C. for three minutes to obtain a polyimide film. A rubbing process is conducted for the film. In the first embodiment, alignment of liquid crystal is controlled by forming the polyimide layer and through the rubbing process. There may also be used another control method in which an alignment layer having a function to align liquid crystal is formed by radiating a polarized ultraviolet ray.

Figure 5:
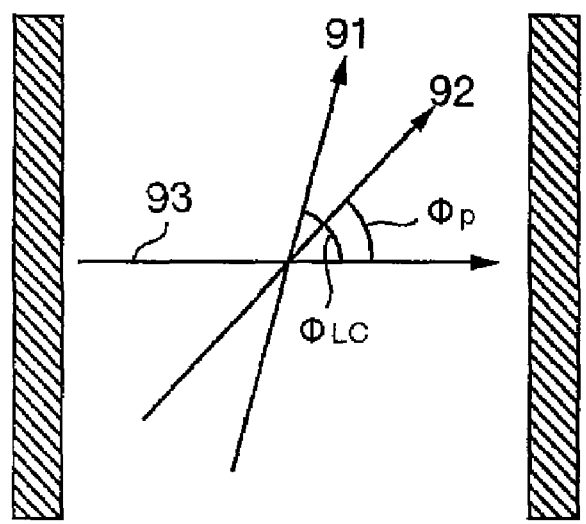
FIG. 5 is a diagram showing angles, relative to an electric field direction, respectively of an alignment direction of a long axis of liquid crystal molecule molecules and a transmission axis of polarized light in a polarizer of an in-plane-switching LCD panel.

FIG. 5 shows angles respectively of an alignment direction of the long axis of liquid crystal molecule and a transmission axis of polarizer relative to an electric field direction. In the in-plane-switching LCD panel of the first embodiment, the alignment layer 16 is indicated by a reference numeral 93, i.e. a direction of the electric field between electrodes, and the long axis direction of liquid crystal molecules applied with an electric field is indicated by a reference numeral 92, i.e. the direction of the electric field with applied voltage. An angle $\phi p$, i.e. an angle between 92 and 93, of the long axis is controlled by the applied electric field. In the obtained aligned state, the direction of the long axis of liquid crystal molecule, as shown by a reference numeral 91 or FIG. 5, an angle of long axis direction of liquid crystal layer is determined by the alignment layer as $\phi_{LC}$, and the angle $\phi_{LC}$ becomes, in this case, 75°. To configure a normally closed type using birefringence, each of transmission axes of the polarizers 11 and 12 are made perpendicular to each other, and the transmission axis of one of the polarizers is made perpendicular to the alignment direction 91 of the long axis of liquid crystal molecule molecules.

The liquid crystal layer 10 includes a liquid crystal composite which is nematic liquid crystal having a positive dielectric anisotropy of 10.2 and a refractive index anisotropy of 0.073.

Figure 6:
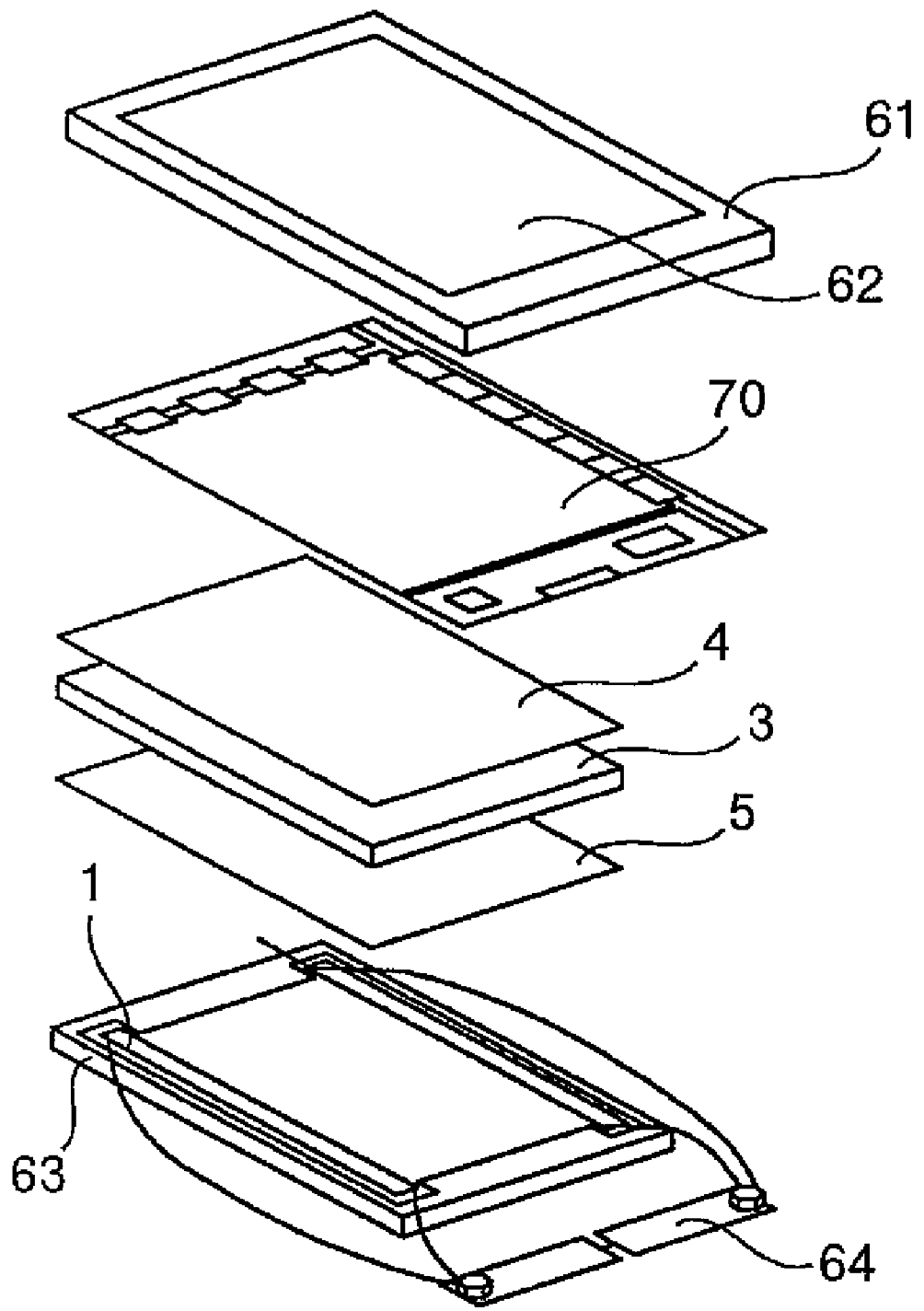
FIG. 6 is a perspective exploded view showing an example of a configuration of a liquid crystal display (module) according to the present invention.

FIG. 6 shows, in a perspective exploded view, a mechanical configuration of the in-plane-switching liquid crystal of the first embodiment. The light source 1 is disposed at an upper end and a lower end of a lower case 63 to which an inverter circuit substrate 64 is attached. The reflector 5, the light guide 3, the diffuser 4, and an LCD panel 70 are sequentially housed in the lower case 63. A shield case 61 having a liquid crystal display window is arranged thereon to protect an upper surface thereof.

Figure 1:
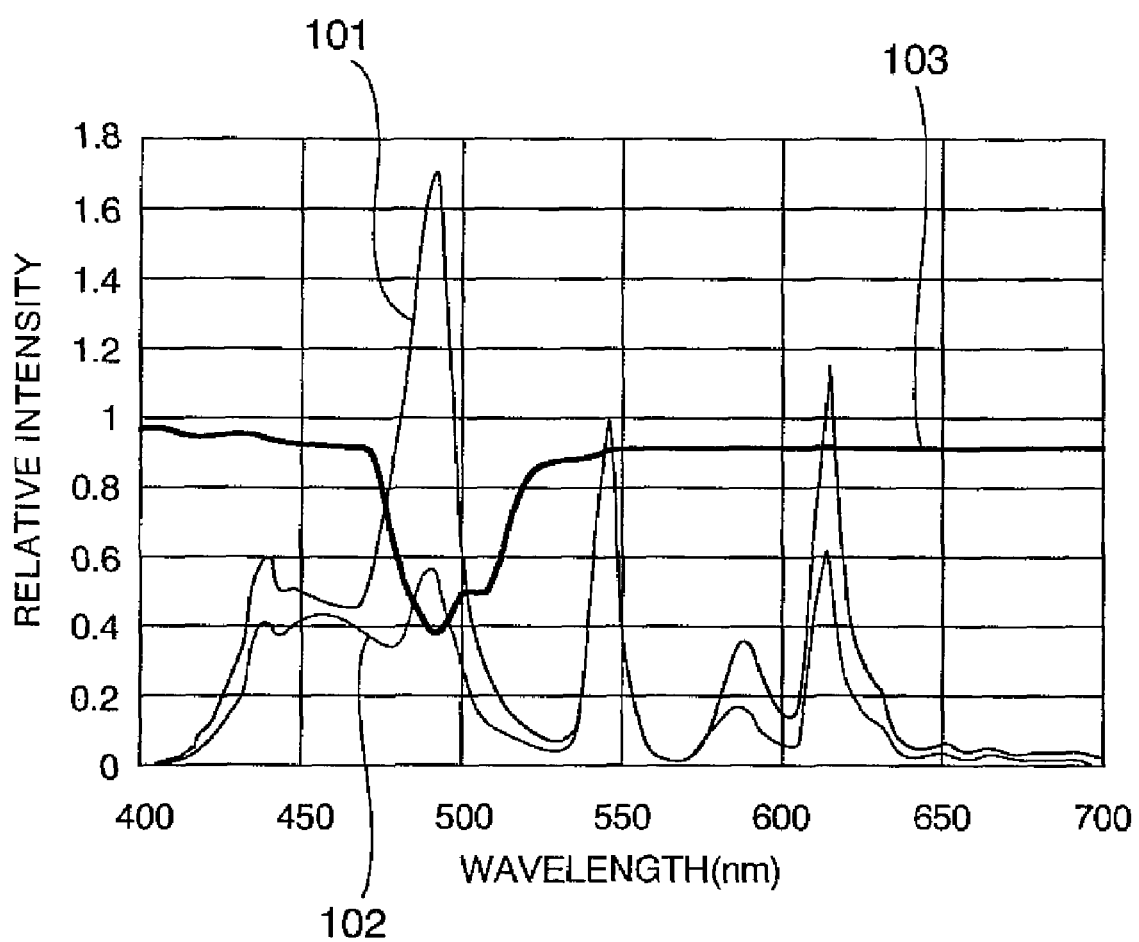
FIG. 1 is a graph showing an example to explain a configuration according to a principle of the present invention.
Figure 7:
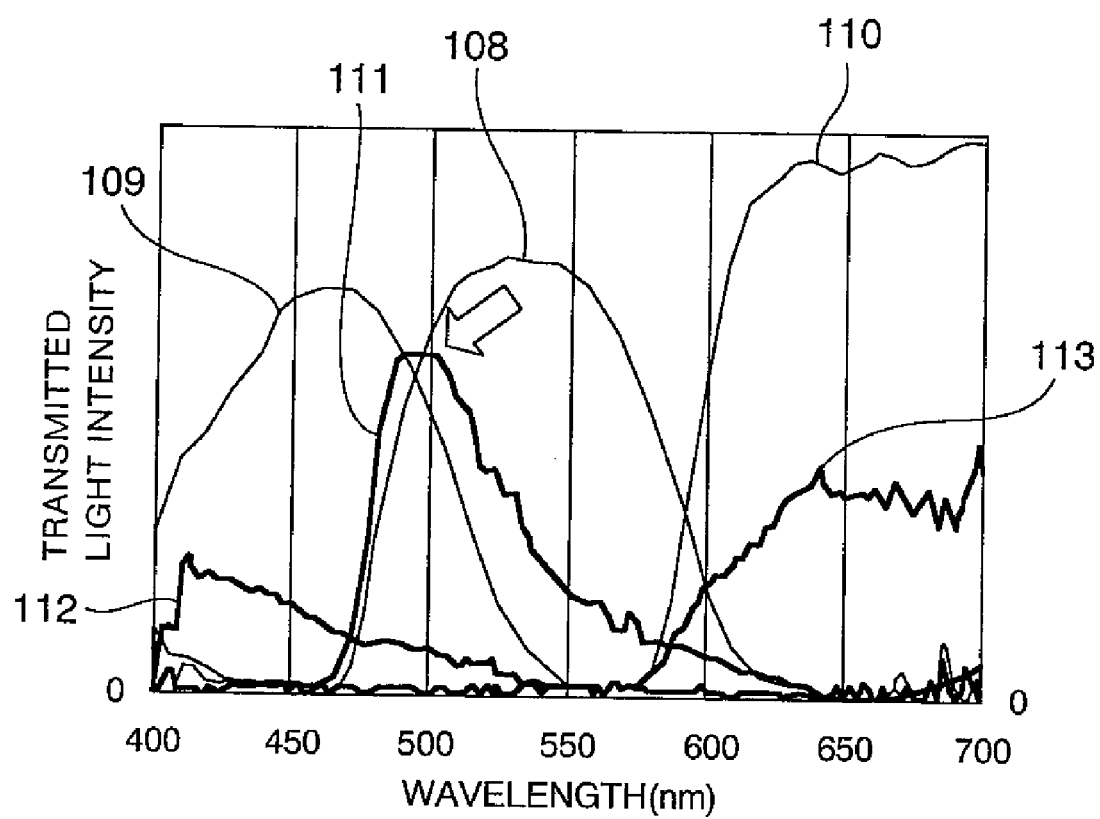
FIG. 7 is a graph showing an object to be achieved by the present invention.
Figure 8:
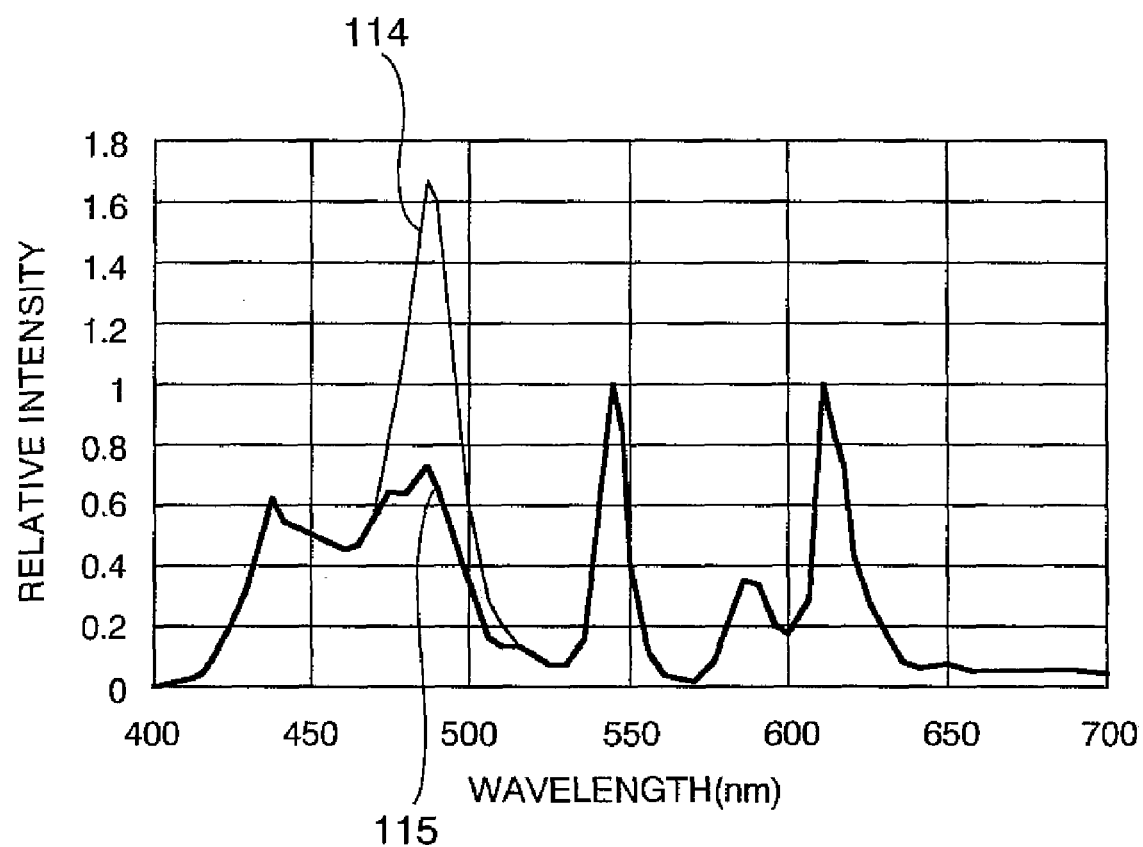
FIG. 8 is a graph showing an example of an advantage of the present invention.

It is possible to retain a high contrast ratio by partially absorbing light having a wavelength in the neighborhood of 490 nm. In the spectra of the LCD panel of normally-closed type, intensity of transmitted light is quite high in the vicinity of 490 nm at black representation as indicated by a solid line 101 in FIG. 1. The intensity is low for high luminance, and the intensity of transmitted light of 545 nm becomes higher. Light in the vicinity of 550 nm is highest in spectral luminous efficiency. However, when a remarkable difference is present as indicated by the solid line 101 in FIG. 1, the intensity of transmitted light in the vicinity of 490 nm is dominant at black representation. Therefore, by arranging a spectrum absorber to absorb light in the vicinity of 490 nm controlling the transmitted light intensity at black representation between the light source and the upper surface of the LCD panel or on the upper surface of the LCD panel, leakage light can be prevented at black representation and black can be sufficiently clearly displayed. The spectrum absorber to absorb light with a wavelength in the vicinity of 490 nm absorbs light not only at black representation but also in all gray scales. However, light near 490 nm is not in a wave band indispensable for the liquid crystal display. In general, a liquid crystal display conducts color representation using three primary colors of blue, green, and red. Gray scales or intermediate colors are determined by a ratio in transmitted light intensity of three primary colors. A degree of color purity, i.e., saturation of blue, green, and red is determined according to a combination of transmitted light through a color filter and an emission band of a light source. In a liquid crystal display, pure colors of blue, green, and red are obtained in the vicinity of 460 nm, 550 nm, and 620 nm, respectively. The spectral characteristic indicated by the solid line 102 in FIG. 1 is an example. That is, light in the vicinity of 490 nm is not light emitted from the liquid crystal display according to an optical design. It is known that, for example, when a three band fluorescent lamp is used as the light source, a subband appears in the vicinity of 490 nm due to green phosphor. However, this is independent of a phenomenon characteristically dominating luminance only at black representation. Referring now to FIG. 7, description will be given of a cause, recognized as a result of discussion of the inventors, of the characteristic 490 nm light transmitted at black representation.

In FIG. 7 showing a spectral characteristic, solid lines 108, 109, and 110 are examples of transmitted light spectra corresponding to transmittivity of green, blue, red display sections of a color filter layer. To indicate the characteristic of the color filter, influence of emission spectra of the light source is removed. It can be seen from FIG. 7 that transmittivity is high at a wavelength to display each color purity described above. However, at black representation, spectra of light transmitted through the crossed polarizer have a characteristic indicated by the solid lines 111, 112, and 113 in FIG. 7. By comparing intensity between three colors, it is known that the spectra of green have remarkably high intensity and has a peak of intensity at 490 nm. This causes the spectral characteristic peculiar or characteristic to black representation in the liquid crystal display, for example, the spectral characteristic indicated by the solid line 101 in FIG. 1. The primary factor is leakage light as described below. Pigment particles of the color filter layer to develop colors scatter polarized light from the light source, mainly, from an inclined direction. The component of light partially depolarized is transmitted as leakage light through the polarizer on the emission side. For the leakage light, the transmitted light intensity is relatively compared in FIG. 7. In FIG. 7, the peak wavelength in the spectrum of green filter in black representation shifts toward short wavelength, as indicated by an arrow. Actually, the intensity is considerably lower than that of transmitted light through the color filter. Therefore, in a range from gray scale presentation to white presentation, it can be considered that the leakage light rarely exerts influence. However, since the system is inherently set to interrupt transmitted light at black representation, it is considered that black is displayed by the leakage light due to the scattering. In the liquid crystal display, this may lead to a change not only in luminance at black representation but also in colors depending on cases. Therefore, this considerably reduces performance of black representation.

Therefore, by disposing a spectrum absorber to absorb leakage light with a wavelength in the vicinity of 490 nm at which the emission intensity characteristically increases at black representation, it is possible to provide a liquid crystal display in which the transmittivity is lowered at black representation and a high contrast ratio is obtained.

From the first embodiment of FIG. 3, the spectrum absorber 40 between the light source and the polarizer 12 is removed to configure a normally-closed liquid crystal display of in-plane-switching type. Black representation in this display is shown as comparative example 1. This corresponds to a narrow solid line 114 in FIG. 8. A bold solid line 115 indicates a spectral characteristic of emission light at black representation in the first embodiment. While luminance is 0.7 cd/m$^2$ at black representation in comparative example 1, luminance is 0.57 cd/m$^2$ at black representation in the first embodiment. This means that by adopting the configuration of the first embodiment, performance of picture quality is improved at black representation.

Second Embodiment

Figure 9:
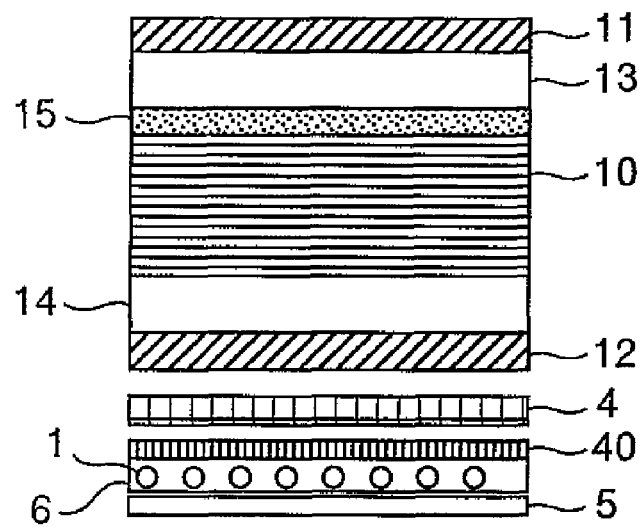
FIG. 9 is a cross-sectional view showing an example of a configuration of a liquid crystal display according to the present invention.

FIG. 9 shows, in a cross-sectional view, an example of a configuration of a liquid crystal display in an embodiment according to the present invention.

A light source unit disposed on a rear surface of an LCD panel of the second embodiment includes a light source 1, a housing unit 6 to house the light source 1, a diffuser 4, and a reflector 5. Although not shown, a prism sheet may be disposed between the diffuser 4 and a polarizer 12, which will be described later. The configuration may also include a phase plate, not shown, between the polarizers 11 and 12 and substrates 13 and 14 adjacent thereto. The phase plate is employed to improve picture quality of a liquid crystal display depending on cases. Specifications of the phase plate are determined according to purposes of use thereof. The effect and the object of the present invention are independent of presence or absence of arrangement of the phase plate. Therefore, the present invention is not restricted by presence or absence of the phase plate.

In the second embodiment, a spectrum absorber 40 is disposed between the light source 1 and the diffuser 4. The spectrum absorber 40 is substantially the same as for the first embodiment.

In the second embodiment, an in-plane-switching LCD panel in which an electric filed applied to a liquid crystal layer is substantially parallel to substrates is adopted as an LCD panel of normally closed type using birefringence. However, the present invention is not restricted by this embodiment in the pixel configuration, the electrode configuration, and the like.

In the LCD panel, a layer of liquid crystal including a plurality of compounds is sandwiched between two transparent substrates 13 and 14. On the outsides of the paired substrates, the polarizers 11 and 12 are respectively arranged. Electrodes, insulating layers, and alignment layers are not shown in FIG. 9. These components are actually formed on a substrate. The substrates are glass substrates in the second embodiment. However, the substrates are not limited, that is, any transparent substrate resistive against the electrode forming process can be used.

Figure 10:
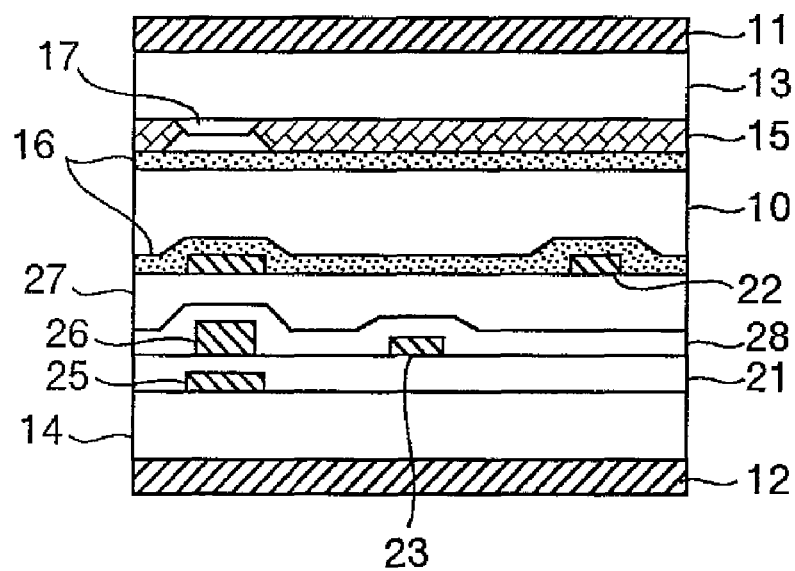
FIG. 10 is a cross-sectional view showing an example of a configuration of an LCD panel according to the present invention.

Referring now to FIG. 10, description will be given of an in-plane-switching LCD panel used in the second embodiment.

On a surface of the substrate 14 on an inner side of the panel, there are disposed a gate electrode 25 and a common electrode, not shown. An insulating layer (silicon nitride layer) 21 is formed to cover the gate electrode 25 and the common electrode. Over the gate electrode 25, an active element 26 of amorphous silicon, polycrystalline silicon, or the like is disposed with the insulating layer 21 between the gate electrode and the active element 26. A video signal electrode is disposed to partly overlap with the active element 26. A passivation layer 28 of silicon nitride is formed to cover the video signal electrode and the active element 26. On the passivation layer 28, an organic passivation layer 27 is disposed using a transparent material such as acrylic resin. The pixel electrode 23 is a transparent electrode made of, for example, Indium Tin Oxide (ITO). The common electrode 22 is formed to be linked via a through-hole, not shown, with a common electrode, not shown, formed on the glass substrate 14. These electrodes and insulating layers are formed in an ordinary method. The alignment direction of liquid crystal molecules of the liquid crystal layer 10 is controlled by an electric field formed between the pixel electrode 23 and the common electrode 22. This enables display operation. Although not particularly shown, in a pixel layout of an in-plane-switching LCD panel, the pixel electrodes 23 and the common electrodes 22 are arranged in parallel with each other to configure curved structure in a zigzag form, and one pixel may include two or more subpixels. The configuration of the second embodiment can include a wider display area than that of the first embodiment and hence is suitable for a liquid crystal television set particularly requiring high luminance. In the second embodiment, the configuration in which a plurality of the light sources are disposed just below the LCD panel is also advantageous to obtain high luminance. This however leads to increase in luminance at black representation.

On the opposing substrate 13, a color filter layer 15 is formed to display color images. In the second embodiment, a light shielding section is disposed on the active element. It is a common practice in a color filter that by disposing such a light shielding section according to necessity, unnecessary leakage light from a non-display are is prevented.

The alignment layer 16 is almost the same as for the first embodiment. In this case, it is also possible to form an alignment layer having a function to align liquid crystal by radiating a polarized ultraviolet ray.

The liquid crystal layer 10 includes a liquid crystal composite which is nematic liquid crystal having a positive dielectric anisotropy of 10.1 and a refractive index anisotropy of 0.081. The liquid crystal layer 10 is about 3.7 µm thick. In another configuration, nematic liquid crystal having a negative dielectric anisotropy is used. In this case, the polarization axis of the polarizer and the alignment direction of the liquid crystal are optimized. The advantageous effect of the spectrum absorber of the present embodiment can be similarly obtained.

Luminance at black representation will be compared using a liquid crystal display configured by removing the spectrum absorber 40 from the configuration of the second embodiment. In comparative example 2, luminance is 1.1 cd/m$^2$ at black representation. In the second embodiment, luminance is 0.9 cd/m2 at black representation, that is, luminance equal to or less than 1.1 cd/m$^2$ can be obtained.

Third Embodiment

The third embodiment includes an LCD panel and the light source unit which are substantially equal in the configuration to the associated constituent components of the second embodiment. These embodiments differ from each other in the arrangement of the spectrum absorber. In the third embodiment, the spectrum absorber is arranged on an upper surface of the polarizer 11 of FIG. 9. In this case, the spectrum absorber 40 is formed, for example, by mixing pigment NK2071, one weight percentage aqueous solution of polyvinyl alcohol having a mean molecular weight of 1000, and methanol with each other at 0.025:0.8:1. The upper surface of the polarizer is then coated with the mixed solution by a spinner (for about three seconds at 350 rpm and for about 25 seconds at 1500 rpm). The substrate is dried at 100° for five minutes on a hot plate to produce a spectrum absorber coated with an about 0.2 µm thick PVA film including a pigment. This method is only an example of production of a spectrum absorber. Materials and processes for the spectrum absorber are not restricted by the method of this embodiment. For example, although the coating process is conducted using a spinner in the third embodiment, there may also be used a printing process using, for example, a rod coater.

The polarizer generally includes a passivation layer, a polarizer layer, a passivation layer, and an adhesion layer. In the third embodiment, the spectrum absorber layer is formed by coating the passivation layer on the upper-most surface with the mixed solution. However, to uniformly produce a spectrum absorbing layer on the passivation layer, it is also effective to conduct pretreatment using, for example, detergent to make the surface of the passivation layer (e.g., triacetyl cellulose) hydrophilic. It is also possible that the pigment is beforehand contained in the passivation layer to obtain a unified configuration together with the spectrum absorber. In the configuration to form a spectrum absorber layer on the upper surface of the polarizer, since only leakage light resultant from depolarization of the polarized light is absorbed, it can be expected to obtain an advantage of improvement of light utilization efficiency. This is further efficient to improve the contrast ratio. In the third embodiment, luminance is 0.81 cd/m$^2$ at black representation.

Fourth Embodiment

The fourth embodiment includes an LCD panel and a light source unit which are substantially equal in the configuration to the second embodiment. These embodiments differ from each other in that the spectrum absorbing function is assigned to a color filter layer 15 shown in FIG. 10.

The color filter layer 15 can be produced, for example, as below. The layer 15 is generally formed by repeatedly conducting a photoresist coating process, an exposure process, and an ashing and cleaning process. The photoresist includes, for example, organic solvent, polymer, monomer, initiator, crosslinking agent, detergent, and pigment. The polymer and monomer as the base include acrylic acid, methacrylic acid, an acrylate derivative, a methacrylate derivative, a poly-acryl derivative, a novolac phenol epoxy resin homologue, a novolac cresol epoxy resin homologue, a poly-acrylate with plural functional groups homologue, a polyimide derivative, a polyol acrylate with plural functional groups homologue, a polyvinyl alcohol derivative, a polyurethane acrylate with plural functional groups homologue, and mixture thereof. The initiator includes a ketone homologue and a triazine homologue having photosensitivity. The crosslinking agent includes an alcohol derivative with plural functional groups, an acrylate derivative with plural functional groups, and an epoxy derivative with plural functional groups having photopolymerization. For blue, green, and red, respective pigments are selected. For example, it is known that PB15:6+PV23, PG36+PY150, and PR177+PY83 are used for blue, green, and red, respectively.

By adding a pigment to the photoresist, a spectrum absorbing function is assigned to the color filter layer. It is an advantage of the configuration that the spectrum absorbing function can be assigned independently to pixels of each color, for example, to a green filter layer or a blue filter layer. This is favorable in that loss of light is prevented and leakage light is efficiently absorbed. When compared with a case in which a solid-state thin film is produced using only pigments, there can be expected an advantage in the above case that the broadening of the absorption wavelength due to influence of association or the like is prevented.

Figure 15:
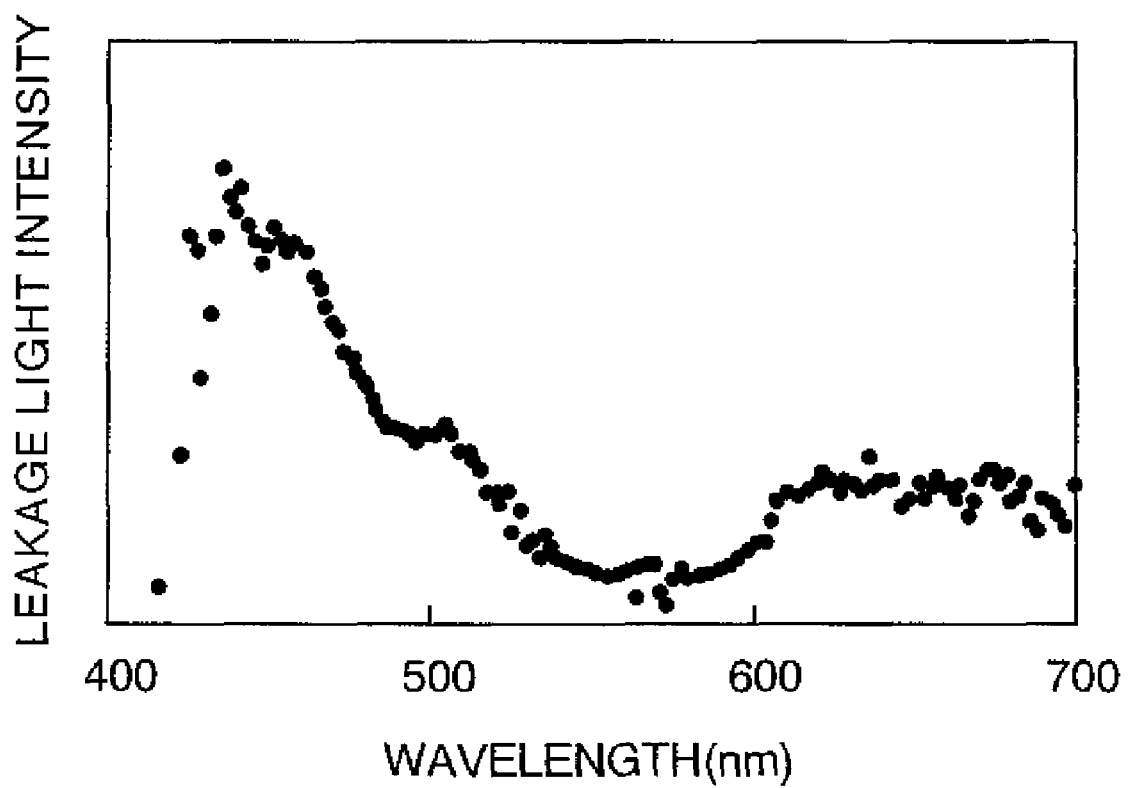
FIG. 15 is a graph showing a spectral characteristic of a green color filter in which polarized light is depolarized to emit leakage light at black representation.

The aspect of the color filter layer described above is most efficiently used when the liquid crystal display includes a color filter having a leakage light characteristic shown in FIG. 15. The graph of FIG. 15 shows characteristic leakage light appearing for an associated wavelength in a green color filter at black representation. This example shows that a large amount of leakage light appears with a wavelength of 450 nm. In this case, since unnecessary light occurs in a wavelength range to display blue, it is favorable to use a component to selectively absorb the unnecessary light appearing from green.

In the fourth embodiment, 0.2 weight percentage of pigment NK3982 is added to green resist to be fully diffused therein to produce a color filter in an ordinary method. As a result, it is possible to obtain luminance of 0.79 cd/m$^2$ at black representation.

Fifth Embodiment

The fifth embodiment includes an LCD panel and a light source unit which are substantially equal in the configuration to the associated constituent components of the second embodiment. These embodiments differ from each other in that a spectrum absorbing layer is formed in the color filter layer 15 shown in FIG. 10.

Figure 11:
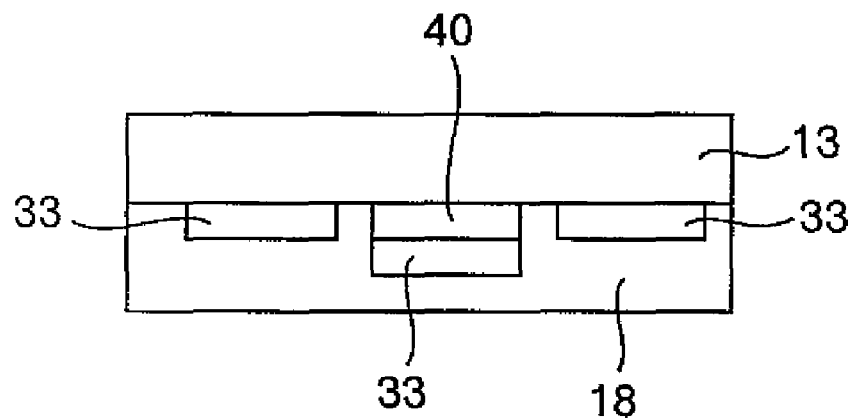
FIG. 11 is a schematic diagram showing an embodiment according to the present invention.

Description will be given of the fifth embodiment by referring to FIG. 11. On a glass substrate 13, a color filter 33 is formed in an ordinary method, and an overcoat layer 18 functioning as a planarization layer or also as a passivation layer is formed thereon. In the fifth embodiment, a spectrum absorber 40 is formed before the planarization layer for pixels of a color of which spectra are to be absorbed. In this configuration, the spectrum absorber is disposed selectively for only the green filter among three filters, i.e., blue, green, and red filters. As above, when unnecessary light from green is required to be selectively absorbed, the configuration is particularly required. Or, by disposing the spectrum absorber for green, blue, or green and blue, it is possible to efficiently absorb unnecessary leakage light at black representation. In the production, a pigment is added to photoresist similar to the photoresist used to configure the color filter. In the fifth embodiment, a spectrum absorbing layer is formed in an upper section of the color filter layer 33 on the side of the substrate 13. However, the order of these layers may be reversed. That is, the spectrum absorber is arranged in an upper section or a lower section of the filter selected from the three filters. However, in the fifth embodiment, light passes through the color filter layer as a scattering layer and then enters the spectrum absorbing layer. Therefore, the fifth embodiment efficiently absorbs scattered light and is advantageous.

Although the color filter layer and the spectrum absorber layer are two mutually different layers in the embodiment, it is also possible that spectrum absorbing material of the spectrum absorber is contained in the color filter layer. In FIG. 11, components such as a light shielding section (black matrix), electrodes, and an alignment layer are not shown. In the fifth embodiment, luminance is 0.78 cd/m$^2$ at black representation.

Sixth Embodiment

The sixth embodiment includes an LCD panel and a light source unit which are substantially equal in the configuration to the second embodiment. These embodiments differ from each other in that a spectrum absorber 40 is formed on the upper surface of the glass substrate 13.

The spectrum absorber 40 is formed, for example, by mixing pigment NK2071, one weight percentage aqueous solution of polyvinyl alcohol having a mean molecular weight of 1500, and methanol with each other at 0.025:1:1. A glass plate is washed through a UV ozone process to have a hydrophilic surface. The glass plate is then coated with the mixed solution by a spinner (for about three seconds at 350 rpm and for about 25 seconds at 1500 rpm). The substrate is dried at 150° for three minutes on a hot plate to produce a spectrum absorber 40 coated with an about 0.3 μm thick PVA film including a pigment. This method is only an example of production of a spectrum absorber. Materials and processes for the spectrum absorber are not restricted by the method of this embodiment. For example, the spectrum absorber may be formed in the arrangement as shown in the first embodiment or may be formed on a film to be pasted onto the substrate 13. Since the spectrum absorber is arranged on a surface of the LCD panel, to protect the spectrum absorber in use, for example, from damages and peeling due to abrasion and from contamination by chemicals used to clean the panel surface, there may be used a configuration in which a passivation layer like that used ordinarily on a surface of a polarizer or a transparent acrylic plate is disposed on the panel surface.

In the sixth embodiment, luminance is 0.84 cd/m$^2$ at black representation.

Seventh Embodiment

Figure 12:
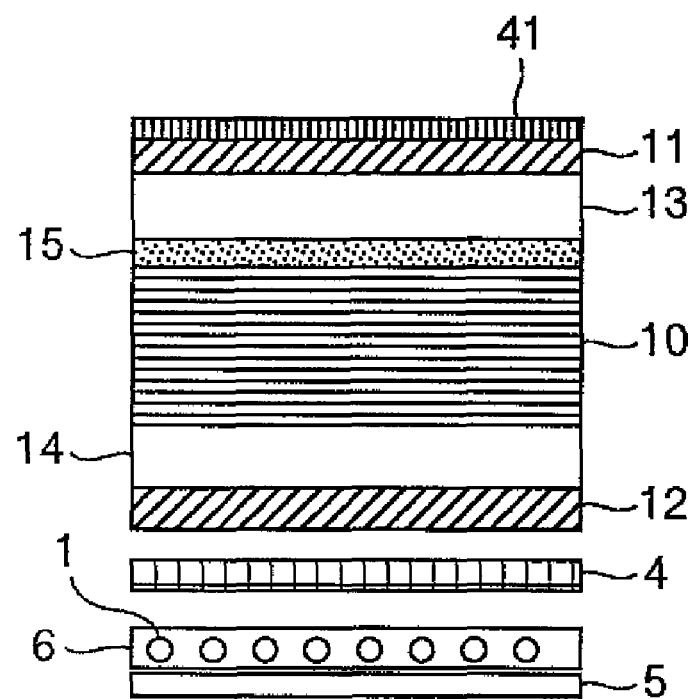
FIG. 12 is a cross-sectional view showing an example of a configuration of a liquid crystal display according to the present invention.

FIG. 12 shows, in a cross-sectional view, a configuration of a seventh embodiment of the liquid crystal display. This embodiment includes an LCD panel and a light source unit which are substantially equal in the configuration to the second embodiment. The liquid crystal composite of the seventh embodiment has refractive index anisotropy of 0.073, and the liquid crystal layer has a thickness of about 4.2 μm.

Figure 2:
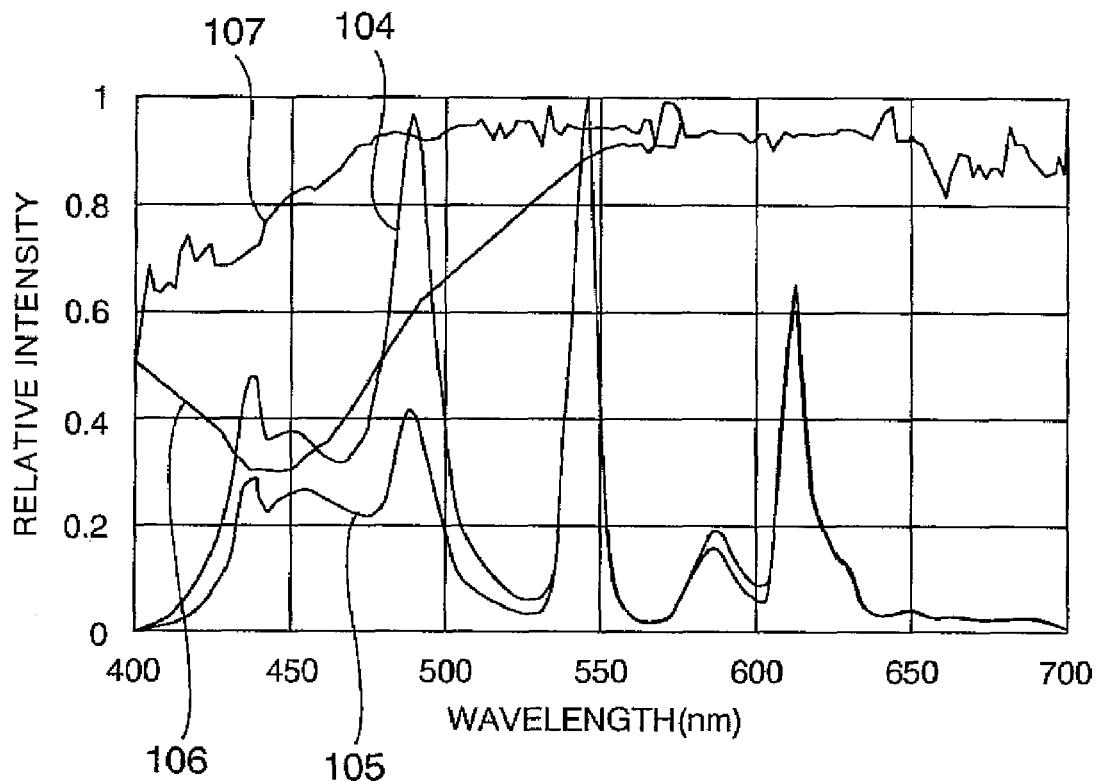
FIG. 2 is a graph showing an example to explain a configuration according to a principle of the present invention.

In the seventh embodiment, a dichroic spectrum absorbing layer 41 is disposed on an upper surface of the polarizer 11. The layer 41 has a feature of dichroic wavelength absorption. The dichroic wavelength absorption characteristic is indicated by a solid line 106 for black representation and by a solid line 107 for white representation as shown in FIG. 2. The dichroic spectrum absorbing layer 41 can be produced in a method similar to that of the process used to produce the polarizer. For example, dichroic pigment LSY-120 is impregnated into a PVA resin layer extended to have monoaxiality. The layer is then fixed onto a passivation layer. A dichroic spectrum absorbing layer can be produced by setting the extending axis perpendicular to the absorption axis of the polarizer 11. The dichroic spectrum absorbing layer has a dichroic characteristic as below. At black representation, the layer absorbs leakage light emitted due to partial depolarization of polarized light when the light passes through the LCD panel. When the liquid crystal changes the initial alignment direction due to an electric field applied thereto, the layer suppresses absorption of light transmitted therethrough. Therefore, the leakage light is highly absorbed only at black representation, and hence reduction of luminance can be prevented at representation of bright colors such as white. This is quite effective to increase the contrast ratio. This advantage will be now described using comparative example 3.

Figure 13:
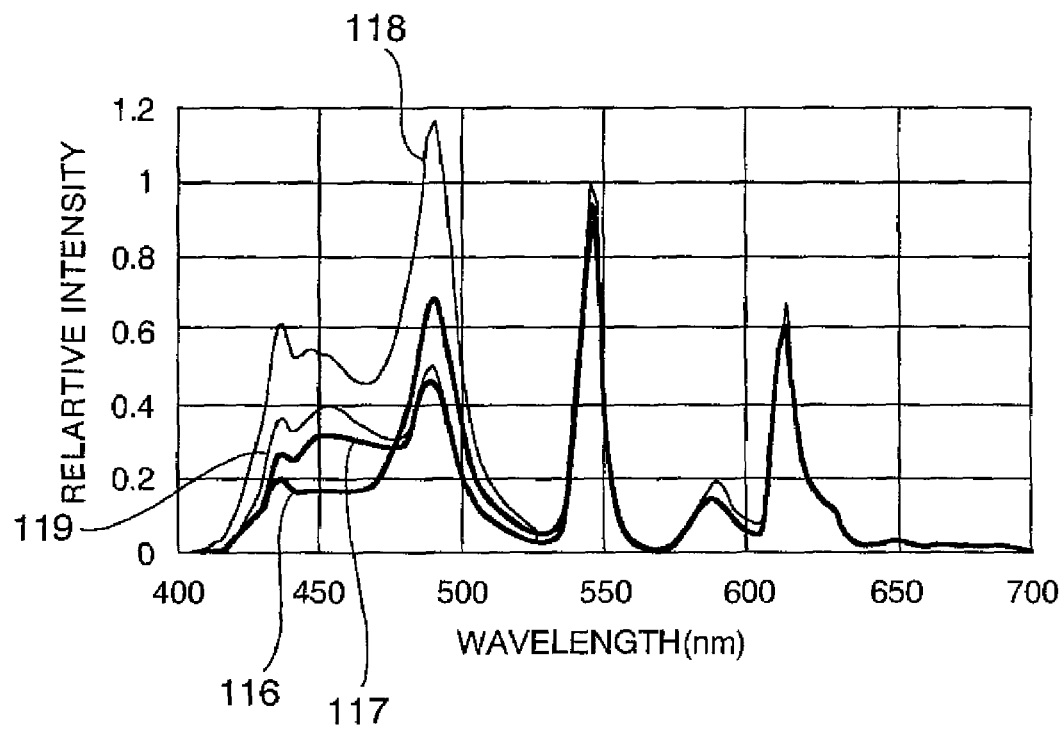
FIG. 13 is a graph showing an example of an advantage of the present invention.

Comparative example 3 is a liquid crystal display produced by removing the spectrum absorbing layer from the seventh embodiment. Luminance is 1.3 cd/m$^2$ at black representation in comparative example 3. FIG. 13 shows transmitted light spectra in comparative example 3 in which a solid line 118 is obtained at black representation and a solid line 119 is obtained at white representation. In the black representation of comparative example 3, intensity of transmitted light characteristically increases in a wavelength range from 435 nm to 490 nm. This leads to a problem that luminance becomes higher at black representation and bluish black is displayed. This is caused not only by the leakage light due to the color filter. The phenomena are caused, for example, because the polarization degree of the polarizer is low in a short wavelength range and the intensity of polarized light depolarized due to scattering in the liquid crystal layer is high on the short wavelength side. This is also affected by the characteristic of the polarization degree of the polarizer and becomes more conspicuous when the scattering in the liquid crystal becomes stronger.

In a situation in which the transmitted light intensity is characteristically strong in a wide range as above, when light is uniformly absorbed, there arises a problem that intensity of blue becomes weak at representation of gray scale and white. The dichroic spectrum absorbing layer used in the seventh embodiment can efficiently absorb leakage light at black representation and can be hence effectively used. FIG. 13 shows the spectral characteristic of the seventh embodiment in which bold lines 116 and 117 respectively correspond to black representation and white representation. At black representation, luminance is 0.78 cd/m$^2$ and the contrast ratio is increased by about 5% as compared with comparative example 3. The remarkable modulation by a wavelength corresponding to blue at black representation can also be suppressed. By disposing a spectrum absorbing component having a dichroic characteristic, the black representation can be improved in a range from 400 nm to 500 nm in which the transmitted light intensity becomes characteristically high as above.

In the seventh embodiment, the dichroic spectrum absorbing layer is a film produced in almost the same process as for the polarizer. To protect the spectrum absorber in use, for example, from damages and peeling due to abrasion and from contamination by chemicals used to clean the panel surface, there may be used a configuration in which a passivation layer like that used ordinarily on a surface of a polarizer or a transparent acrylic plate is disposed on the panel surface. When the dichroic pigment is a compound to be used in a coating process by, for example, a rod coater using, for example, a pigment having a characteristic of liquid crystal which aligns spontaneously, the spectrum absorbing layer may be formed directly on the polarizer. It is efficient to form the dichroic spectrum absorbing layer on an outer side of the polarizer on the emission side.

Eighth Embodiment

In the eighth embodiment, a vertically aligned (VA) LCD panel is used as the liquid display panel.

Generally, in the VA LCD panel, liquid crystal molecules are aligned substantially perpendicular to a surface of a substrate. With application of a voltage to the panel, the molecules are inclined relative to the surface of the substrate. This is a so-called VA type. In the VA type, there exists a configuration in which to expand a viewing angle, a structure in the form of a projection is disposed on a substrate so that the molecules are inclined not only to one direction, but also to a plurality of directions, generally, two to four directions. Two or more alignment states simultaneously exist in the configuration. There exists also a configuration in the VA type in which electrodes are formed in the shape of slits to control the direction of inclination of the liquid crystal molecules to allow two or more alignment states at the same time.

Figure 14:
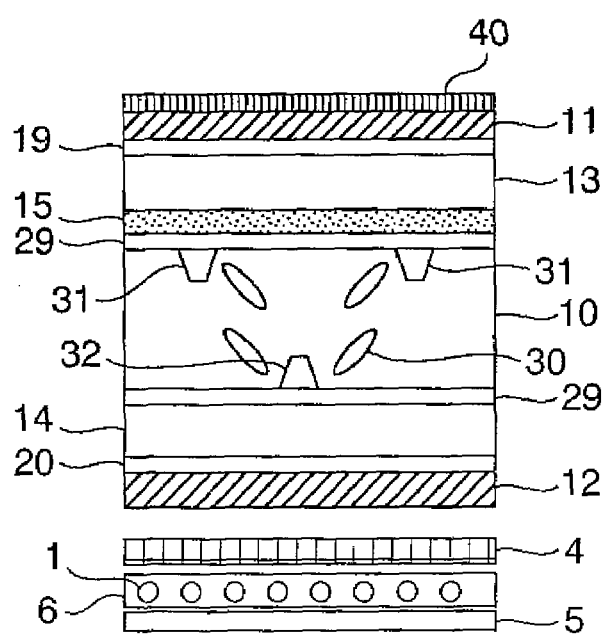
FIG. 14 is a cross-sectional view showing an example of a configuration of an LCD panel according to the present invention.

Referring now to FIG. 14, description will be given of the configuration used for the eighth embodiment. The configuration of the VAN LCD panel is not restricted by the eighth embodiment for the following reason. That is, the characteristic wavelength appearing at black representation due to partial depolarization of polarized light when the light passes through the LCD panel is a common phenomenon which occurs independently of the pixel layout. Therefore, the way to solve the cause of the phenomenon is also valid in any pixel layout.

In the eighth embodiment, the light source unit disposed on the rear surface of the LCD panel is substantially equal in the configuration to the second embodiment.

In the eighth embodiment, the spectrum absorber 40 is arranged on an upper surface of the polarizer 11. The spectrum absorber 40 is similar to that of the second embodiment.

In the LCD panel, a liquid crystal layer 10 including a composite of a plurality of compounds is sandwiched between two transparent substrates 13 and 14. On the outer sides respectively of the substrates 13 and 14, polarizers 11 and 12 are respectively disposed. Between the polarizers 11 and 12 and the substrates 13 and 14, an optical film is disposed to compensate for and to expand the viewing angle.

On an inner surface of the substrate 14, a transparent electrode 29 is formed on which a linear structure 32 is formed using dielectric substance. On an inner surface of the substrate 13, a transparent electrode 29 is formed on which a linear structure 32 is formed using dielectric substance. The substrate includes a vertical alignment layer, not shown, and the liquid crystal layer 10 has negative dielectric anisotropy.

Either one of the electrodes 29 respectively of the substrates 13 and 14 is a common electrode. The other one thereof is a pixel electrode formed together with an active element, not shown. Liquid crystal molecules 30 on one side of the linear structure 32 are opposite in the alignment direction to liquid crystal molecules 30 on the opposing side of the linear structure 32. The polarization axis of the polarizers 11 and 13 is arranged in a direction having an angle of 45° relative to the director of the liquid crystal molecules when a voltage is applied thereto. In the configuration, slit-shaped electrodes may be formed in place of the linear structures 31 and 32.

As comparative example 4, a liquid crystal display is produced by removing the spectrum absorber 40 from the liquid crystal display described above. In comparative example 4, luminance is 0.9 cd/m$^2$ at black representation. Since luminance is 0.69 cd/m$^2$ at black representation in the eighth embodiment, an advantage thereof is confirmed.

Ninth Embodiment

The ninth embodiment includes an LCD panel substantially equal in the configuration to the seventh embodiment and a dichroic spectrum absorbing layer. These embodiments differ from each other in that light emitting diodes (LED) are used in the light source. Unlike the three band fluorescent lamp, the light emitting diodes have an aspect that light can be emitted with quite a small half-band width for each of blue, green, and red. For example, light emission with a wavelength of 490 nm can be suppressed by the light source. However, when leakage light appears in a wide range from 430 nm to 490 nm, the characteristic at black representation can be improved by a dichroic spectrum absorbing layer. By comparing a configuration not using a dichroic spectrum absorbing layer with that of the ninth embodiment using a dichroic spectrum absorbing layer, an advantage of the former configuration can be confirmed. That is, luminance is 0.9 cd/m$^2$ in the former configuration and 0.81 cd/m$^2$ in the latter configuration. The light source unit including an LED light source is in a configuration in which a plurality of LEDs are arranged just below the LCD panel on a front surface thereof or in a configuration in which LEDs are linearly arranged and a light is radiated onto a front surface of the LCD panel using a light guide. The light source may include a white LED in which blue, green, and red LEDs are configured in one unit or may include blue, green, and red LEDs which are independent from each other. When LEDs are used for the respective colors, the ratio therebetween is not necessarily set to 1:1:1. If light emission can be independently controlled for each color, there can be obtained an aspect that color matching can be easily established in consideration of the overall display operation of the liquid crystal display. In these configurations, the dichroic spectrum absorbing layer used in the ninth embodiment can improve display performance at black representation.

Paying attention to the leakage light having a characteristic wavelength peak at black representation in an LCD panel, the inventors propose a liquid crystal display including a spectrum absorber to selectively absorb light in the wavelength range to thereby reduce luminance at black representation to improve the contrast ratio. In addition to the spectrum absorbers used in the embodiments described above, other spectrum absorbers can also be used. For example, when a resin substrate can be used, the spectrum absorber can be advantageously arranged in a constituent component of the liquid crystal display as below. For example, spectrum absorbing compounds are added to the substrate or the alignment layer, a macromolecular structure of the alignment layer is substituted by a functional group to absorb light of a predetermined wavelength, or spectrum absorbing compounds are added to an overcoat layer of the color filter layer.

Tenth Embodiment

Figure 16:
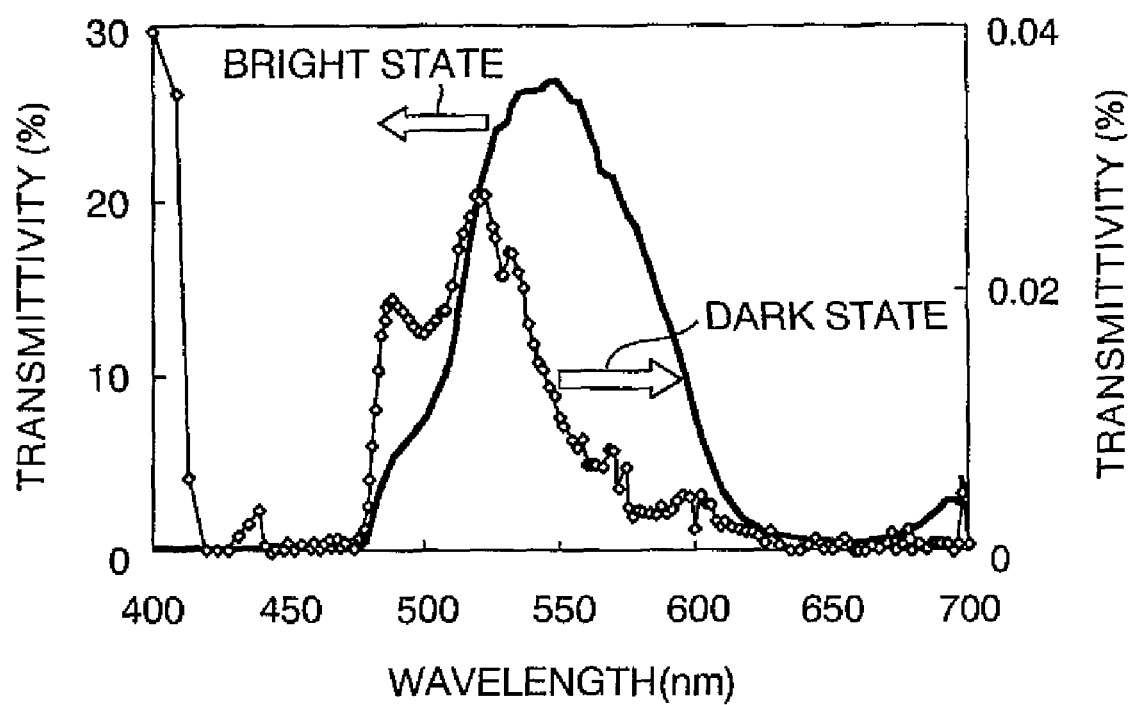
FIG. 16 is a graph showing a relationship between a wavelength and transmittivity according to the present invention.

FIG. 16 shows, in a graph, a wavelength-versus-transmittivity characteristic for green according to the present invention. A bold line indicates the characteristic in a bright state with transmittivity on the left-hand side. Since the bright state is a state in which light double-refracted in the liquid crystal layer is transmitted therethrough, FIG. 16 shows spectra of light having passed through the parallel polarizer and the color filter. Since the transmitted light characteristic of the parallel polarizer is substantially flat in a wavelength range of light which the green color filter transmits therethrough, the spectral contour in the bright state shown in FIG. 16 is substantially equal to that of the color filter. On the other hand, the characteristic in a dark state is indicated by small circles and narrow lines with transmittivity on the right-hand side. The transmittivity in the dark state is associated with the leakage light from the crossed polarizer. In this case, a color filter is arranged between crossed polarizers. The leakage light is caused by scattering in the color filter.

According to the present invention, since light of which polarization is disturbed and which is therefore in a particular wavelength range is absorbed by an absorbing component, the transmitted light in the bright state is shown by a characteristic waveform as indicated by the bold line in FIG. 16. That is, when light is transmitted through an LCD panel according to the present invention, the transmitted light through the green color filter is shown as a waveform having a plurality of peaks, a waveform having a concavity, or a waveform having a shoulder on the left-hand side of a center of a peak thereof.

In the dark state, the waveform has a peak of leakage light in the vicinity of a wavelength of 500 nm as described in conjunction with the above embodiment. In the invention of the present application, since the leakage light is efficiently absorbed by an absorbing component, the transmitted light characteristic in the dark state is indicated by a waveform having two peaks of transmittivity as indicated by narrow lines in FIG. 16.

When each of the blue and green color filters includes an absorbing component or has an absorbing filter, a concavity occurs in the vicinity of a wavelength of 500 nm also in a wavelength range corresponding to blue. On the other hand, when the absorbing component is arranged only for the green color filter, light having passed through the green filter is shown by a waveform having two or more peaks or a concavity. Light having passed through the blue filter or the red filters is indicated by a waveform having a single peak without any concavity.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display, comprising:
a pair of substrates including a polarizer;
a liquid crystal layer sandwiched between the substrates of the pair;
a color filter layer sandwiched between one of the substrates of the pair and the liquid crystal layer; and
a light source for supplying light to the pair of substrates, the liquid crystal layer, and the color filter layer wherein:
the color filter layer includes three filters for displaying blue, green and red; and
only the green filter of the three filters selectively includes an absorbing component capable of absorbing a light spectrum within a wavelength range from 480 nm to 500 nm.

2. The liquid crystal display according to claim 1, wherein the one of the substrates of the pair sandwiching the color filter layer with the liquid crystal layer comprises the one of the substrates of the pair which is arranged furthest from the light source.

3. A liquid crystal display, comprising:
a pair of substrates including a polarizer;
a liquid crystal layer sandwiched between the substrates of the pair;
a color filter layer sandwiched between one of the substrates of the pair and the liquid crystal layer; and
a light source for supplying light to the pair of substrates, the liquid crystal layer, and the color filter layer wherein:
the color filter layer includes three filters for displaying blue, green, and red;
a spectrum absorbing layer is selectively arranged in one of an upper section and a lower section of only the green filter; and
the spectrum absorbing layer absorbs a light spectrum within a wavelength range from 480 nm to 500 nm.

4. The liquid crystal display according to claim 3, wherein the one of the substrates of the pair sandwiching the color filter layer with the liquid crystal layer comprises the one of the substrates of the pair which is arranged furthest from the light source.

* * * * *